Nov. 27, 1951    B. SPEARMAN    2,576,367
RAILWAY TRUCK BOLSTER-CAR BOLSTER CONNECTION

Filed May 12, 1948    2 SHEETS—SHEET 1

INVENTOR
B. SPEARMAN
BY Fetherstonhaugh & Co.
ATTORNEYS

Patented Nov. 27, 1951

2,576,367

UNITED STATES PATENT OFFICE 2,576,367

RAILWAY TRUCK BOLSTER-CAR BOLSTER CONNECTION

Benjamin Spearman, Montreal, Quebec, Canada

Application May 12, 1948, Serial No. 26,609

1 Claim. (Cl. 105—199)

This invention relates to improvements in railway car trucks, and a particular object is to provide a cast or otherwise molded one piece frame structure including spaced side truck frame members integrally joined together by a transversely extending truck bolster.

Another object of this invention is to provide a novel side bearing spring supporting arrangement which is adapted to support the car bolster and to control the side sway thereof.

A further object is to provide a novel safety arrangement of the brake beams in the truck side frames whereby the brake assembly is prevented from dropping onto the rails which might otherwise cause derailment of the car.

These and other objects and characteristic features of this invention will be more readily understood from the following detailed description taken in connection with the accompanying drawings, in which—

Figure 1:
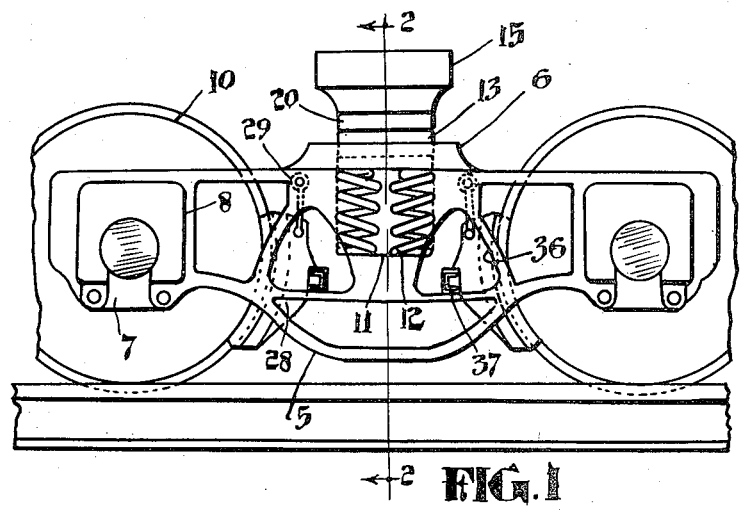
Fig. 1 is a side elevational view of a truck embodying my invention.
Figure 2:
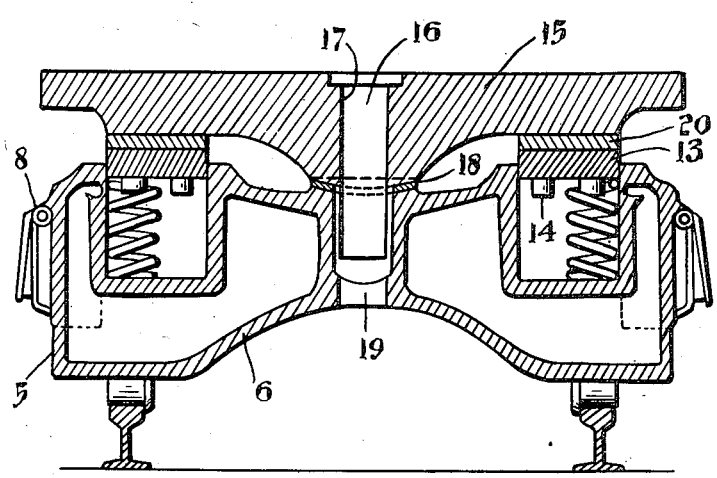
Fig. 2 is a sectional view taken along the lines 2—2 of Fig. 1.
Figure 3:
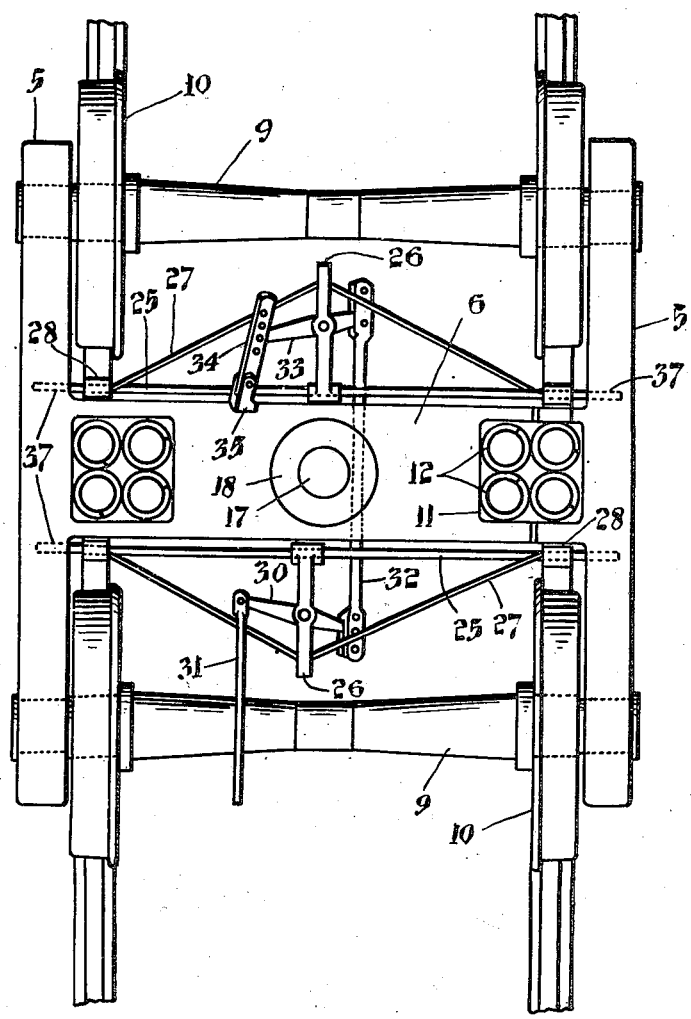
Fig. 3 is a plan view of the truck with the car bolster and spring holder plates removed.

As shown in the accompanying drawings, my improved truck assembly includes a one-piece frame structure comprising spaced side frames 5 integrally joined together by a transversely extending truck bolster 6. Side frames 5 and bolster 6 are cast, molded or otherwise formed as a single unit.

The wheel pieces of side frames 5 are recessed at 7 in a substantially inverted U-shape for the reception of journal boxes 8 into which the wheel axles 9 are journalled. Wheels 10 are suitably mounted on axles 9 to rotate therewith. Truck bolster 6 is recessed to provide a spring pocket 11 adjacent each side frame 5 for the reception of car bolster, side bearing, supporting springs 12. Springs 12 are preferably coil springs arranged in groups of four in each pocket 11 and are retained in said pocket by a spring holder consisting of a plate member 13 vertically slidable in the pocket and having downwardly projecting studs 14 about which the upper sections of springs 12 are helically coiled.

A transversely extending car bolster 15 is pivotally mounted on truck bolster 6 by means of a center pin 16. Center pin 16 has its upper end fitted in a central opening 17 provided in the car bolster 15 and its lower end projecting downwardly through a saucer-shaped center plate 18 carried by truck bolster 6 and into a central opening 19 in said truck bolster. Friction blocks 20 carried by the overlying ends of car bolster 15 are arranged to be interposed between spring holder plate 13 and the car bolster. Although I have shown, for illustrative purposes, friction blocks interposed between the spring holder plate and the car bolster, any suitable side bearing mechanism may be employed, such as single or multiple roller type side bearings.

The friction blocks 20 are secured to the under side of car bolster 15 adjacent its ends in any conventional manner (not shown), such as by bolting the blocks to the car bolster. Each block 20 retains frictional contact with the corresponding spring holder plate 13 and is slidable on the bearing surface of plate 13 in response to movement of the car bolster relative to the truck so as to maintain proper contact relation between the block and bearing surface of the plate 13.

The car truck may be equipped with any conventional type of brake mechanism. In the drawings, I have shown the strap tension type beam 25 having channel fulcrum struts 26 and tension straps 27. Beams 25 are carried adjacent their ends by brake heads 28 which are suspended by hangers 29 from the truck frame. A brake lever 30 mounted in one fulcrum 26 has its upper end connected to a brake push rod 31 and its lower end connected to one end of a connection rod 32 which is connected at its opposite end to the lower end of a second brake lever 33 pivotally mounted in the other fulcrum 26. The upper end of lever 33 is pivotally secured to a dead lever guide 34 which is fastened to a bracket 35 preferably cast integrally or molded with the side frame and truck bolster unit.

The side frames 5 are provided with openings indicated at 36 into which extensions 37 of the brake beams 25 protrude. The bottom edges of openings 36 are shown substantially horizontally disposed to permit freedom of movement of the brake beams into and out of the braking engagement with the wheels. Due to failure of the brake assembly it frequently happens that the brakes and brake beams will drop down on the wheels or on the rails and cause derailment or other serious difficulties. By extending the ends of the brake beams through the openings 36 in the side frames of the truck, I have provided an arrangement whereby, in the event of failure of the brake assembly, the beams instead of dropping on the rails, will be caught and supported by the lower defining walls of the openings 36. The bottom edge of openings 36 could also be slightly inclined so as to cause the brake beam when dropping thereon to be guided away from interference with the wheels.

Having thus described what I now believe to be the preferred embodiment of this invention, it will be understood that changes and modifications may be resorted to without departing from the scope and spirit of my invention as defined in the appended claim.

I claim:

In combination, a car including a car bolster, a car truck comprising an integrally moulded frame structure including spaced side truck frame members separated by a transversely extending truck bolster as a single unit, a pair of spring supporting pockets moulded into said truck bolster member intermediate its opposite ends, means pivotally mounting said car bolster on the central portion of the truck bolster for support of the central portion of said car bolster against vertical movement relative to said truck bolster, and a plurality of resilient side bearing supporting springs arranged in each spring supporting pocket to resiliently engage side portions of the car bolster to resist side tilting of the car bolster about its central pivotal mounting.

BENJAMIN SPEARMAN.

REFERENCES CITED

The following references are of record in the file of this patent:

UNITED STATES PATENTS

| Number | Name | Date |
| --- | --- | --- |
| 332,682 | Turner | Dec. 15, 1885 |
| 774,673 | Kaylor | Nov. 8, 1904 |
| 784,837 | Cliff | Mar. 14, 1905 |
| 916,556 | Howard | Mar. 30, 1909 |
| 1,008,921 | Komarek | Nov. 14, 1911 |
| 1,346,765 | Porter | July 13, 1920 |
| 1,408,321 | Wellman | Feb. 28, 1922 |
| 1,686,182 | Sheffield et al. | Oct. 2, 1928 |
| 1,707,536 | Nuetzel | Apr. 2, 1929 |
| 1,765,432 | Lamont | June 24, 1930 |
| 1,978,207 | Kjolseth | Oct. 23, 1934 |
| 1,995,113 | Brossart et al. | Mar. 19, 1935 |